(12) United States Patent
Sekora

(10) Patent No.: US 9,408,498 B2
(45) Date of Patent: Aug. 9, 2016

(54) ADJUSTABLE LINER FOR USE IN DEEP FRYERS OF DIFFERENT WIDTHS

(76) Inventor: Donna Eve Radtke Sekora, Baltimore, MD (US)

(*) Notice: Subject to any disclaimer, the term of this patent is extended or adjusted under 35 U.S.C. 154(b) by 846 days.

(21) Appl. No.: 13/530,684

(22) Filed: Jun. 22, 2012

(65) Prior Publication Data

US 2013/0341258 A1   Dec. 26, 2013

(51) Int. Cl.
*A47J 37/12* (2006.01)

(52) U.S. Cl.
CPC .................................. *A47J 37/1295* (2013.01)

(58) Field of Classification Search
None
See application file for complete search history.

(56) References Cited

U.S. PATENT DOCUMENTS

| | | | | |
|---|---|---|---|---|
| 872,837 | A * | 12/1907 | Mio | A21B 3/13 220/8 |
| 958,857 | A * | 5/1910 | Dennis | A47J 47/20 134/135 |
| 1,396,416 | A * | 11/1921 | Garrett | A47L 19/04 210/477 |
| 1,579,874 | A * | 4/1926 | Locke | A47J 37/1204 99/403 |
| 1,810,855 | A * | 6/1931 | Rockmore | A47L 19/04 211/85 |
| 1,932,097 | A * | 10/1933 | Biggs | A47L 15/28 134/135 |
| 2,535,967 | A * | 12/1950 | Thiermann | A47J 43/24 126/25 C |
| 2,635,527 | A * | 4/1953 | Overbeck | A47J 37/1223 99/408 |
| 2,716,938 | A | 9/1955 | Smith | |
| 2,840,257 | A * | 6/1958 | Zeni | B65D 7/24 220/8 |
| 2,907,487 | A * | 10/1959 | Harrington | A47B 88/20 220/8 |
| 2,912,137 | A * | 11/1959 | Taylor | B65D 90/046 220/23.87 |
| 3,232,439 | A * | 2/1966 | Dahl, Jr. | B42F 17/02 211/10 |
| 3,869,972 | A * | 3/1975 | Chase | A47J 37/1276 99/403 |
| 3,933,645 | A * | 1/1976 | Keramidas | A47J 37/1223 210/305 |
| 3,937,136 | A * | 2/1976 | Cox | A47J 37/1223 210/493.3 |
| 3,975,997 | A * | 8/1976 | DiPietro | A47J 37/1219 220/485 |
| 5,016,772 | A * | 5/1991 | Wilk | B65D 21/086 220/495.01 |
| 5,033,369 | A * | 7/1991 | Wu | A47J 37/1295 210/167.28 |
| 5,037,541 | A * | 8/1991 | Ruey-Jang | E03F 5/06 210/141 |
| 5,069,781 | A * | 12/1991 | Wilkes | E03F 5/041 210/164 |
| 5,192,019 | A * | 3/1993 | Meehan | B65D 5/324 220/8 |
| 5,247,876 | A * | 9/1993 | Wilson | A47J 37/1223 210/232 |
| 5,284,580 | A * | 2/1994 | Shyh | B01D 29/117 210/163 |

(Continued)

*Primary Examiner* — Robert James Popovics

(57) ABSTRACT

An adjustable liner, for immersion in the cooking oil of a deep fryer, includes: (a) two partial baskets, each having a bottom surface with four edges and three side surfaces, each of which extends upwardly from one of the bottom surface's edges so that the fourth edges of these partial baskets are free edges, (b) wherein the bottom surfaces of each of these partial baskets has a porosity chosen so as to allow the cooking oil to circulate through these bottom surfaces when the deep fryer is in use, and (c) wherein the lengths of these partial baskets' free edges are such as to allow one of these partial baskets to fit and nest within the other so as to yield a liner having adjustable length that can be custom fitted to the width of the deep fryer in which this liner is to be retrofitted for use.

3 Claims, 4 Drawing Sheets

(56) References Cited

U.S. PATENT DOCUMENTS

| | | | |
|---|---|---|---|
| 5,397,464 A * | 3/1995 | Hannon | B01D 29/35 210/63 |
| 5,404,799 A * | 4/1995 | Bivens | A47J 37/1223 134/111 |
| 5,595,107 A * | 1/1997 | Bivens | A47J 37/1223 210/167.28 |
| 5,731,024 A * | 3/1998 | Bivens | A47J 37/1223 210/167.28 |
| 5,823,097 A * | 10/1998 | Dirck | A47J 37/1271 137/341 |
| 5,862,535 A * | 1/1999 | Noga | E03C 1/264 4/286 |
| D417,124 S * | 11/1999 | Chen | 211/60.1 |
| 6,085,640 A * | 7/2000 | King | A47J 37/1271 210/DIG. 8 |
| 6,092,670 A * | 7/2000 | Marriott | A47J 45/10 210/469 |
| 6,176,175 B1 | 1/2001 | Moreth | |
| 6,364,120 B1 * | 4/2002 | Sanchez | A47J 37/1223 210/167.28 |
| 6,547,080 B1 * | 4/2003 | Guard | A47J 43/24 209/926 |
| 6,591,741 B1 | 7/2003 | Martin | |
| 6,684,760 B1 * | 2/2004 | Rajusth | A21B 3/13 220/574 |
| 6,691,884 B1 * | 2/2004 | Dwyer | F25D 3/08 220/4.03 |
| 6,732,636 B1 | 5/2004 | Germano | |
| 7,066,563 B2 * | 6/2006 | Berger | A47B 88/20 312/205 |
| 7,380,894 B2 * | 6/2008 | Berger | A47B 88/20 312/301 |
| 7,383,963 B2 | 6/2008 | Svabek et al. | |
| 7,504,024 B1 * | 3/2009 | Batten | E03C 1/20 210/154 |
| 7,775,156 B2 | 8/2010 | Sus et al. | |
| 8,307,759 B2 * | 11/2012 | Ketter, Jr. | A47J 37/1295 210/455 |
| 8,337,694 B1 * | 12/2012 | Sykes | E04F 19/10 210/163 |
| 8,651,017 B2 * | 2/2014 | Bivens | A47J 37/1223 99/408 |
| 8,807,355 B2 * | 8/2014 | Merey | A47B 88/20 211/175 |
| 9,220,369 B1 * | 12/2015 | Yelverton | A47J 47/02 |
| 2004/0155564 A1 * | 8/2004 | Berger | A47B 88/20 312/348.3 |
| 2005/0224434 A1 * | 10/2005 | Silvas | B25H 3/06 211/70.6 |
| 2008/0083753 A1 * | 4/2008 | Escobar | B65D 25/06 220/8 |
| 2008/0202976 A1 * | 8/2008 | Burgess | A47B 88/20 206/558 |
| 2009/0288564 A1 | 11/2009 | Ketter, Jr. | |
| 2011/0288319 A1 | 11/2011 | Profughi et al. | |
| 2013/0341258 A1 * | 12/2013 | Sekora | A47J 37/1295 210/167.28 |

* cited by examiner

ADJUSTABLE LINER FOR USE IN DEEP FRYERS OF DIFFERENT WIDTHS

BACKGROUND OF THE INVENTION

1. Field of the Invention

The present invention relates generally to a food apparatus. More particularly, the present invention relates to an adjustable liner for immersion in the cooking oil of any one of a multitude of different width, deep fryers to allow for the removal of the cooking sediment that would otherwise accumulate in the bottom of such fryers.

2. Description of the Related Art

The invention is particularly applicable to deep fryers and their fryer baskets and will be described with particular reference thereto. However, it will be appreciated by those skilled in the art that the invention has broader applications and may also be adapted for use as a deep fryer trap, deep fryer filter, and the like.

Restaurants that serve fried food use a great deal of cooking oil. When food particles are not filtered and make their way into the oil, they cause the oil to break down more quickly. This affects the taste of the fried food and greatly shortens the useable lifespan of the cooking oil.

Typically fryer baskets are constructed of thick wire with wide gapes formed between the wires. This arrangement allows food particles to remain in the deep fryer through many fry cycles, thus reducing the quality and useable lifespan of the oil. By removing the food particles more frequently, preferably every shift, the oil is maintained at a higher quality for a longer period of time.

Efforts to maintain cooking oil quality for longer periods of time have yielded less than ideal solutions. See, for example, U.S. Patent Publications 2009/0288564 and 2011/0288319 and U.S. Pat. Nos. 6,176,175, 6,591,741, 6,732,636, 7,383,963 and 7,775,156.

Many potential solutions to the above-identified problem focus on filtering the oil after the fryer is done being used—this requires the entire fryer being drained and filtered. This method is time consuming, not energy efficient, and by consequence expensive. Many potential solutions simply focus on speeding up this method by constructing built in filters for fryers or suction filters that more quickly filter the oil.

Other potential solutions focus on inserting metal mesh liners into traditional fryer baskets. While this solves some of the short comings of the previously mentioned solutions, it also creates several new problems. Among the problems is that the fry liners can fall out of the traditional basket if not properly secured. Also, food particles can become lodged between the mesh and the wire basket, thus diminishing the effectiveness of the liners.

The usefulness of such prior liners has also been negatively impacted by the fact that their static sizes meant that they often could not effectively be alternately used across a range of differing-width, deep fryers.

Accordingly, there is a need for the development of a new and improved, deep fryer liner that can be interchangeably used with different-width deep fryers, and which would overcome the cooking sediment filtering difficulties of prior liners while providing better and more advantageous overall results in terms of extending the useful life of the cooking oils used in such deep frying processes.

SUMMARY OF THE INVENTION

Recognizing the need for the development of an improved, deep fryer liner for removing the cooking sediment that would otherwise accumulate in the bottom of such fryers, the present invention is generally directed to satisfying the needs set forth above and overcoming the problems and disadvantages exhibited by prior, deep fryer liners.

In accordance with a preferred embodiment of the present invention, an adjustable liner for temporary immersion in the cooking oil of any one of a multitude of different-width, deep fryers, to allow for the removal of the cooking sediment that would otherwise accumulate in the bottom of such fryers, includes: (a) a first, partial basket having a bottom surface with four edges and three, side surfaces, each of which extends upwardly from one of the bottom's edges so that this partial basket's fourth edge is a free edge of a specified first length, (b) a second, partial basket having a bottom surface with four edges and three, side surfaces, each of which extends upwardly from one of the bottom's edges so that this second partial basket's fourth edge is a free edge of a specified second length, (c) wherein the bottom surfaces of each of these partial baskets has a porosity chosen so as to allow cooking oil to circulate through these bottom surfaces when the deep fryer is in use, (d) wherein the difference between the lengths of the partial baskets' free edges is such so as to allow the second partial basket to fit and nest for an adjustable, telescoping distance into the first partial basket and wherein, in such a nested configuration, these partial basket' free-edge-adjoining, side surfaces are in close proximity so that can be temporarily and releaseably locked together so that this liner is custom fitted to the width of the deep fryer in which it is to be used.

This adjustable liner may also include: (e) the porosity of the bottom surfaces of these partial baskets being in the range of 5-25 percent, and (f) the side surfaces of these partial baskets being non-porous so as to aid in the cleaning of and the reduction of the fabrication costs of these side surfaces.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
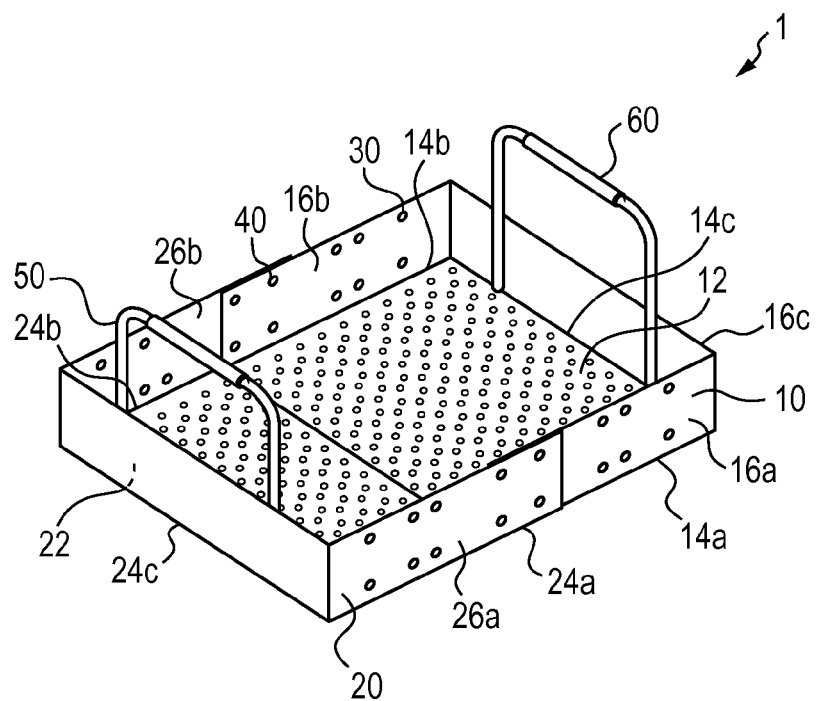
FIG. 1 is a perspective view of a preferred embodiment of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 2:
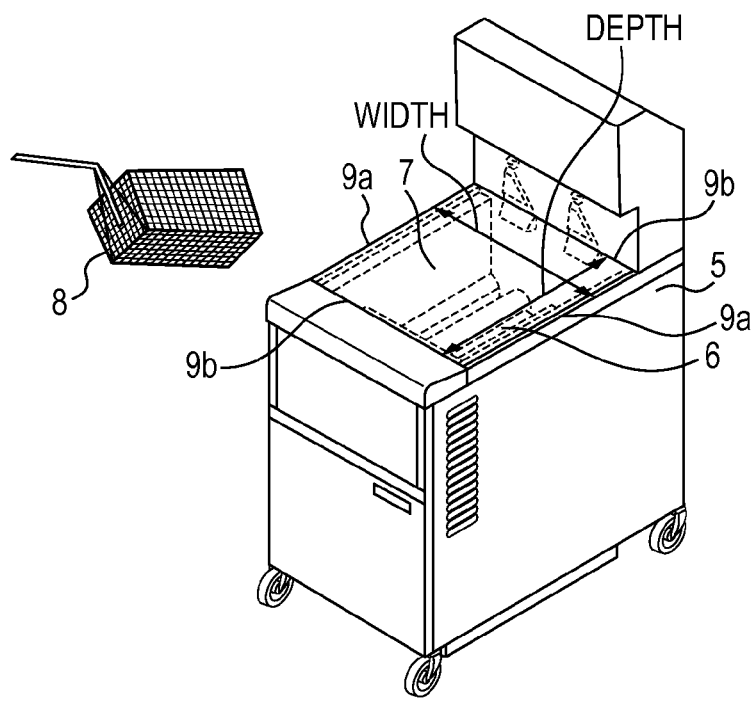
FIG. 2 is a perspective view of the typical fryer basket whose bottom would sit in the present invention after it had been placed in the reservoir of a deep fryer.

Referring to FIG. 1, there is illustrated a preferred embodiment of the present invention 1 in the form of an improved, adjustable width, deep fryer liner 1, for cyclic or temporary immersion in the cooking oil of any one of a multitude of deep fryers 5 into which this liner is to be retrofitted for use. This retrofitting is necessary because deep fryers do not come with such liners, meanwhile, such fryers differ in the widths between their endwalls 9a and the depths between their sidewalls 9b and therefore the number of fryer baskets 8 which each deep fryer can accommodate. The liner is designed to allow for the removal, by the use of the liner 1, of the cooking sediment that would otherwise accumulate in the bottom or reservoir 7 of such deep fryers 5. See FIG. 2.

Figure 3:
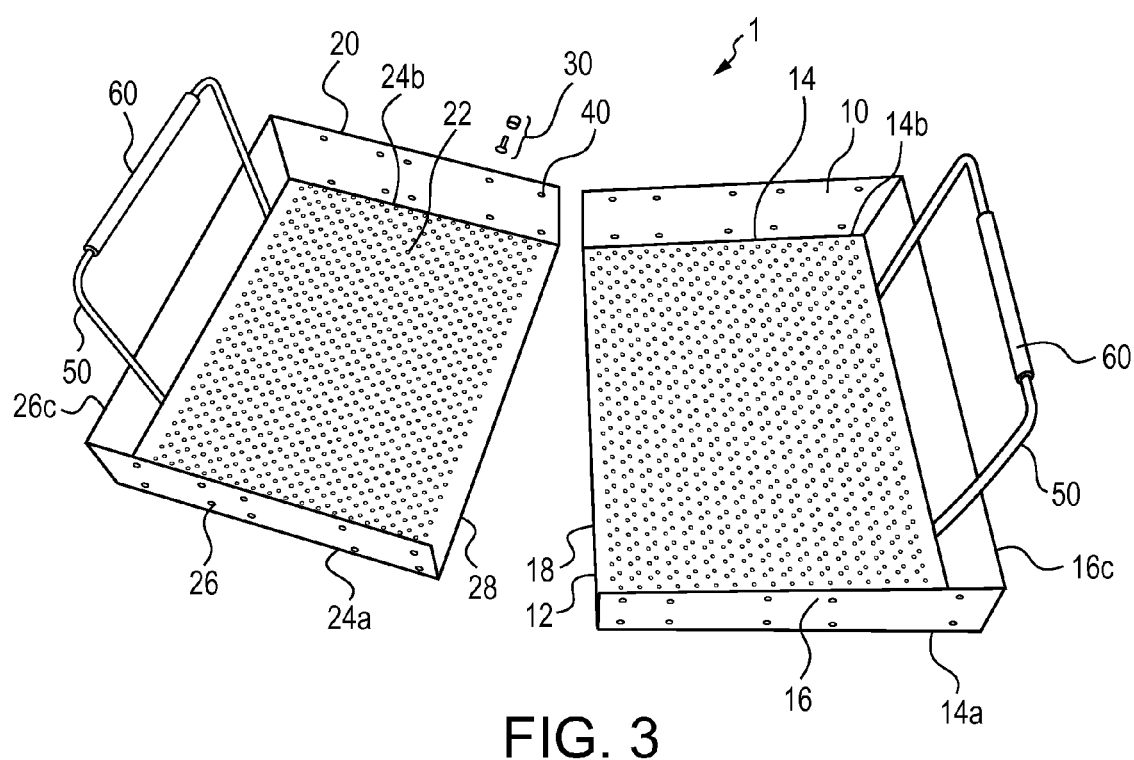
FIG. 3 is a perspective, exploded view of an adjustable-width, preferred embodiment of the present invention where its two partial baskets can be clearly seen.

The present invention is seen to have parts or elements that include a first, partial basket 10 which has a flat, rectangular bottom surface 12 with four boundary edges 14. From three of these edges, there are upwardly extending side surfaces 16. This bottom surface's fourth edge is what is referred to herein as an original free edge 18 which has no side surface extending from it. See FIG. 3. Alternatively, we may refer to this first partial basket as having a bottom surface 12 with two, first partial side edges 14a, 14b, a first end edge 14c and a first free edge 18, and where a side surface extends from each of the two side edges and an end surface extends from the bottom's end edge.

This original free edge 18 is seen to have a length or first length or dimension in the liner's depth direction (i.e., between the bottom of the upwardly extending side surfaces at each end of the original free edge, or between the partial basket's side surfaces) that is equivalent to the depth of this first partial basket. A close tolerance is placed on this first length or depth because of the requirement that this first partial basket and its companion second partial basket 20 be configured such that they can fit, overlap and nest together with side and bottom surfaces that are held in close proximity to one another so as to allow this second partial basket to telescope from the first partial basket as the adjustable width of the liner 1 is varied.

The liner's second, partial basket 20 is seen to be configured similarly to the liner's first, partial basket 10. It 20 has a flat, rectangular bottom surface 22 with four boundary edges 24. From three of these edges, there are upwardly extending side surfaces 26. The bottom's fourth edge is also an original free edge 28 which has no side surface extending from it. Alternatively, we may refer to this second partial basket as having a bottom surface 22 with two, second partial side edges 24a, 24b, a first end edge 24c and a first free edge 28, and where a side surface extends from each of the two side edges and an end surface extends from the bottom's end edge.

Both of these partial baskets are seen to have non-porous side surfaces 16, 26 and porous bottom surfaces 12, 22 which allow a deep fryer's cooking oil to circulate through the basket's bottom surface 12, 22 when the deep fryer is in use.

The side surfaces 16, 26 that adjoin the original free edges 18, 28 of each of these partial baskets 10, 20 each have a number of holes 40 that are used for connecting and fixing the partial baskets together. These holes 40 are spaced apart and aligned similarly on each pair of basket side surfaces 16, 26 so that these holes can be aligned when the partial baskets are overlapped or nested together in certain fixed relationships. These configurations thereby provide the liner with a discrete number of fixed widths. When so aligned, a number of locking anchors 30, usually eight, are placed through these then overlapping holes 40 so as to temporarily lock the partial baskets together.

Alternately, rather than have only a discrete number of fixed widths, the partial baskets' side surfaces can be provided with slots which run in the width direction of one or both of the partial baskets so as to provide the liner with infinite adjustability within the width ranges of the liner. For lexicon purposes, such slots may also be referred to herein as elongated holes or even as holes 40.

When these partial baskets are configured, arranged and locked together in this manner, they provide a liner 1 which has an inner space that is open on its top, bounded on four sides by non-porous, overlapping side surfaces 16, 26 and on its bottom by porous, overlapping bottom surfaces 12, 22.

There are many suitable materials from which the present invention can be fabricated and all are considered to come within the scope of the present invention. However, after some experimentation, a high quality, grade 304, stainless steel was selected from which to fabricate most preferred embodiments of the present invention. Grade 304, stainless steel is probably the most common steel used in fabricating many types of food processing equipment. A sheet product of 16 gauge (0.060 inches) was found to be the most cost effective for the current application. The fabrication materials yield a liner that is easily cleaned and will provide years of effective use.

A handle 50 is provided on each partial basket and attached on the side surface that is opposite the basket's original free edge, also referred to herein as end-surfaces. These handles will typically also be fabricated from stainless steel and can easily be welded to their adjoin side surfaces 16, 26. Alternatively, if it is thought that there will ever be a need to remove them, they can be easily affixed by providing them with holes that align with holes that are placed in the adjoining sidewall and then using any one of a wide assortment of fasteners to secure them to the sidewall.

In a preferred embodiment, the side surfaces of these partial baskets that do not contain handles 16a, 16b, 26a, 26b were fabricated such that their dimensions are in the range of 10-11 inches and holes are located in them such that the width dimension of the liner can be set at one-half inch increments in the range of 11.5 to 17.5 inches.

Experimentation was conducted to determine what porosity or hole sizes would be optimum for the basket's bottom surfaces to retain any cooking sediment or debris, provide for adequate cooking oil circulation and still leave the bottom surfaces so that were relatively easily to clean at some frequency that did not require the baskets being taken out of service for cleaning during their normal use cycles or shifts (e.g., 10-16 hours). Porosities in the range of 5-25% were found to be sufficient for a wide range of deep fryer cooking tasks. Preferred embodiment have porosities in the range of 10-15%, with a preferred embodiment having a porosity of 11% and consisting of 3/32 inch diameter holes drilled through the bottoms at the corners of imaginary squares having a side dimension of 0.25 inches.

The height of the sidewall surfaces 16, 26 of this liner is dictated by the height or depth of the oil that will be used in the deep fryer reservoirs 7 in which the liner sits—i.e., the sidewall surfaces need to have a height that allows them to extend above the free surface of the cooking oil so as to avoid cooking sediment that may be floating on the free surface of the oil floating outside the inner or confined space of the liner. For a wide range of deep fryers, a sidewall height in the range of 2.5 to 3.5 inches was found to be satisfactory, with an optimum height probably being around 2.75 inches.

Similarly, the depth (i.e., as measured between the bottom of the upwardly extending side surfaces 16a, 16b, 26a, 26b) of the present invention is set by the fryer basket, from among the many that can be used in various deep fryers, that has the largest depth. From surveying many fryer baskets used in the industry, it was found that providing the current liner 1 with a depth of 13-14 inches, preferably 13.5 inches, would accommodate many of the industry's fryer baskets 8.

Figure 4:
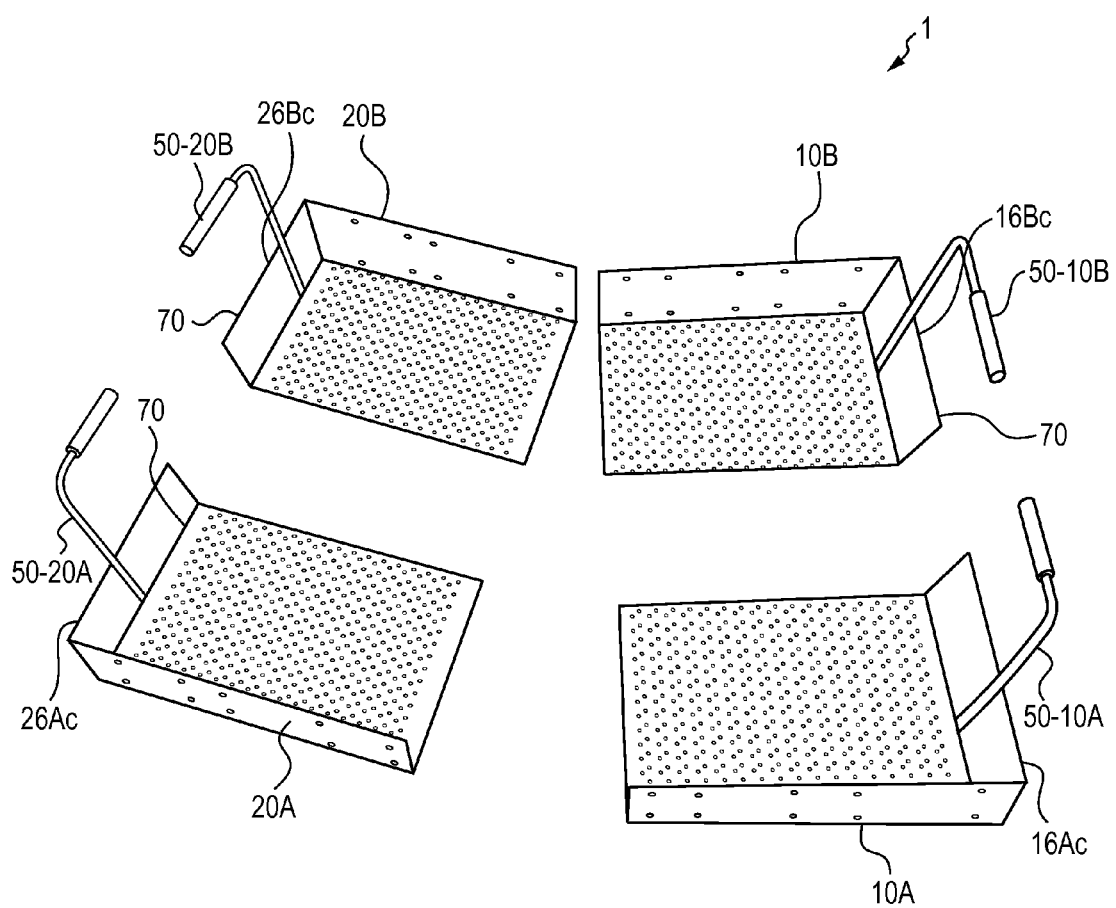
FIG. 4 is a perspective, exploded view of an adjustable-width and adjustable-depth, preferred embodiment of the present invention that utilizes four quartile baskets.

Alternatively, to provide the liner of the present invention with adjustability in its depth dimensions, this liner can be configured so that is consists of four quartile baskets. See FIG. 4 which shows the first and second partial baskets each configured in two parts 10A, 10B, 20A, 20B by dividing each of the original partial baskets along a dividing line that runs from the basket's original free edge (preferably perpendicular to it) and continues along the bottom surfaces, up and through the endwall 16Ac, 16Bc, 26Ac, 26Bc to which a handle is attached and finally thru the handles themselves.

In this configuration and to allow the pieces of the handles 50-10A, 50-10B, 50-20A, 50-20B to telescope into each other, two of these partial handles are of slightly larger diameter and hollow or tubular, e.g., 50-10A & 50-20A, while the other partial handles 50-10B, 50-20B are rods whose diameters are chosen so that they can slide into and telescope from their tubular mates 50-10A & 50-20A.

Suitably aligned holes or slots 70 are placed in the endwalls 16Ac, 16Bc, 26Ac, 26Bc which contain the partial handles and used with anchors 30 in order to lock these endwalls together at any desired liner depth that is within the range of the depths achieved with these suitably dimensioned parts 16Ac, 16Bc, 26Ac, 26Bc.

In a preferred embodiment, the endwalls 16Ac, 16Bc, 26Ac, 26Bc which contain the partial handles were given a dimension of 10-12 inches and slots used in some of them so as to make these sidewalls adjustable through a width range of 11 to 18 inches.

Once set to their desired width (and possibly also depth) dimensions, the liner of the present invention is simply placed into the reservoir 7 of a deep fryer 5 such that it rests on the fryer's tubes or baffles 6. During the frying process, any food particles (e.g., breading products) or cooking sediment are caught inside the liner before they can reach the bottom of the deep fryer. At any time and using its handles, the liner can be safely removed from the deep fryer and cooking residue wiped from it using a paper towel, then it is washed in a manner similar to that used to wash a food basket.

The present invention saves a busy kitchen the time, aggravation and effort it takes to clean cooking sediment from the bottom of a deep fryer. Furthermore, its other benefits include: (a) since a deep fryer's cooking oil does not become contaminated with cooking sediment as rapidly as before when using the present invention, the effective working life of the cooking oil has been more than doubled- or, expressed in a different manner, the kitchen's use of cooking oil has been halved, (b) decreased chance that smoke will come from the fryer as a result of the unwanted occurrence of cooking sediment getting too close to the hot baffles in the bottom of the deep fryer's reservoir, (c) reduced deep fryer wear and tear and the possibility that might have to be prematurely replaced due to the elimination of the need to scrape cooking sediment from the bottom of the deep fryer's reservoir, and (d) increased possibility of better tasting and better looking food coming from the deep fryer as a result of the elimination of food being cross-contaminated with cooking sediment from prior deep fryings.

Figure 5:
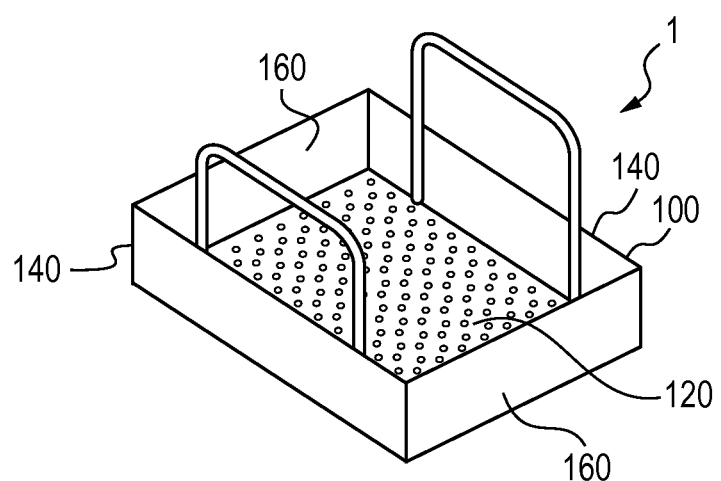
FIG. 5 is a perspective view of a preferred embodiment of the present invention.

The advantages of the present invention are so significant that one is left to wonder why a liner similar to that disclosed herein is not a standard part of all commercial deep fryers. Thus, rather than the width and depth adjustable liners described above for retrofitting into variously sized, commercial deep fryers, a non-adjustable liner that consists of a basket 100, with a porous (i.e., porosity in the range of 5-20 percent) bottom 120, and non-porous end 140 and side surfaces 160, that is custom-sized to the dimensions of the reservoir of the deep fryer with which is to be used should come with all future, commercial deep fryers. Such an improvement of the standard deep fryer is considered to come within the scope of the present invention. See FIG. 5.

The foregoing is considered as illustrative only of the principles of the invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereinafter set forth in the claims to the invention.

I claim:

1. A deep fryer comprising:
a rectangular, open-top reservoir having endwalls and sidewalls, in which cooking oil is situated;
an adjustable liner within said reservoir, said adjustable liner including:
an adjustable liner basket having a rectangular bottom surface with two end edges from each of which extends upwardly an end surface and two side edges from each of which extends upwardly a side surface, wherein said liner basket bottom surface has a porosity in the range of 5-25 percent and allows said cooking oil to circulate through said liner basket bottom surface during operation of said deep fryer, and wherein said end and side surfaces are non-porous, said liner basket including: a first, partial basket section having a first partial bottom surface with a first end edge and a first free edge and two, first partial side edges, and a first end surface extending from said first end edge and two first partial side surfaces, one of which extends upwardly from each of said two, first partial side edges, a second, partial basket section having a second partial bottom surface with a second end edge and a second free edge and two, second partial side edges, and a second end surface extending from said end edge and two second partial side surfaces, one of which extends upwardly from each of said two, second partial side edges, and said partial baskets are shaped and dimensioned so allow said second partial basket to adjustably overlap and nest in first partial basket so as to provide the ability for said second partial basket to telescope from said first partial basket so that the distance between said first and second end surfaces is such that said end surfaces are adjacent the endwalls of said reservoir, said first and second partial basket side surfaces each having a plurality of holes that are dimensioned, shaped and oriented so that at least some of said holes align for releasably locking said partial baskets together, and said liner further comprising a plurality of anchors for releasably locking said partial baskets together by engagement with said side surface holes; and
fryer baskets inserted within said adjustable liner basket.

2. A deep fryer as recited in claim 1 wherein, the liner basket is both length and width adjustable, said liner basket being divided into four quartile partial basket sections.

3. A deep fryer as recited in claim 1 or 2, wherein said partial basket sections further comprise handles.

* * * * *